M. H. AMBROSE.
WHEEL.
APPLICATION FILED OCT. 15, 1920.
1,381,100. Patented June 14, 1921.
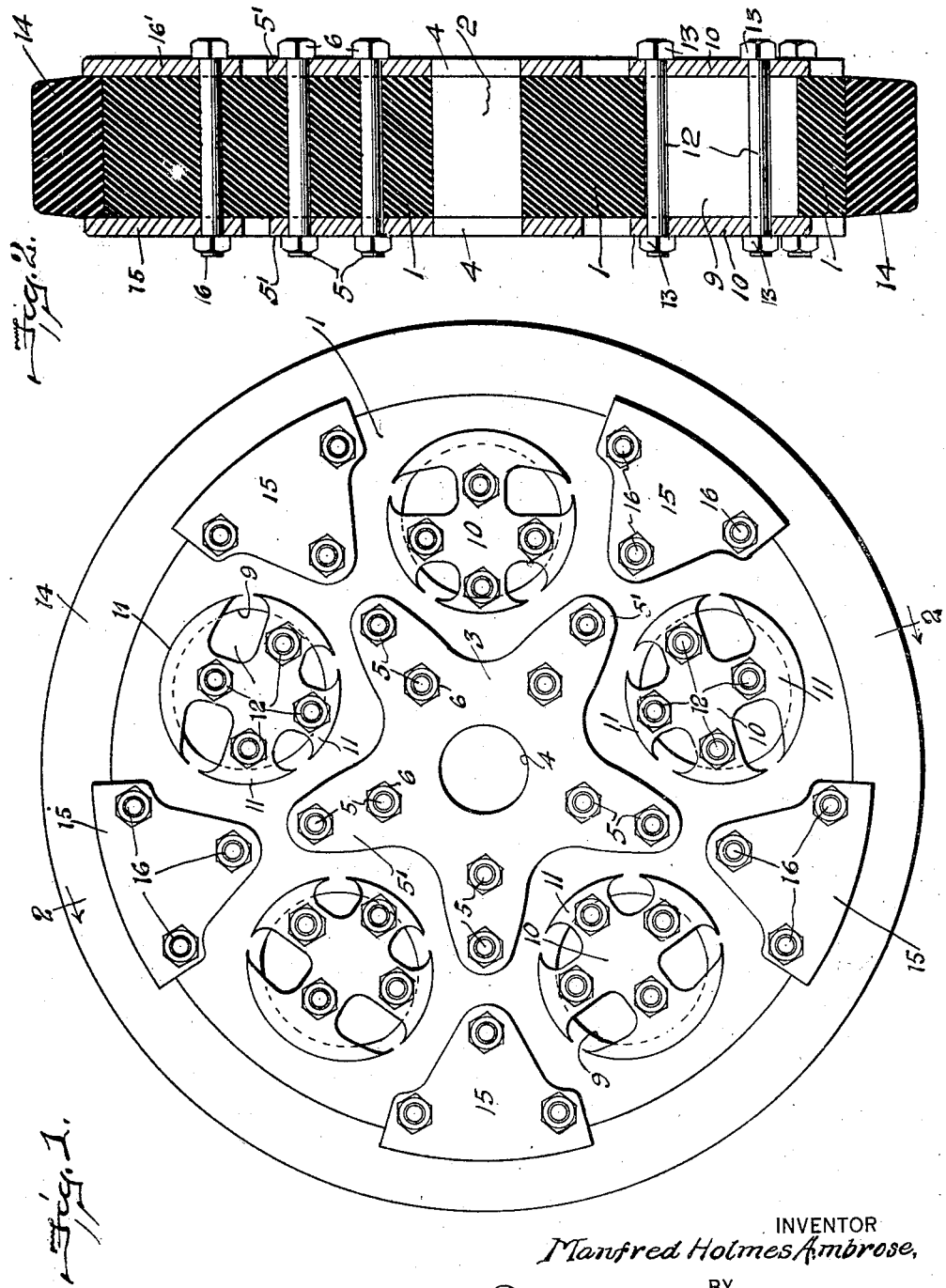

UNITED STATES PATENT OFFICE.

MANFRED H. AMBROSE, OF SPRINGFIELD, OHIO.

WHEEL.

1,381,100. Specification of Letters Patent. Patented June 14, 1921.

Application filed October 15, 1920. Serial No. 417,185.

*To all whom it may concern:*

Be it known that I, MANFRED HOLMES AMBROSE, a citizen of the United States, residing at Springfield, in the county of Clark and State of Ohio, have invented certain new and useful Improvements in Wheels, of which the following is a specification, reference being had therein to the accompanying drawing.

My invention relates to wheels for vehicles and in particular to wheels for automobile equipment.

The object of my invention is to provide a resilient structure which shall have the necessary rigidity at the points of strain, but shall eliminate the necessity for a pneumatic tire. It is particularly useful on trucks and upon lighter vehicles.

It is my object to, generally, reverse the ordinary practice of having rigid hub, spokes and rim by providing a resilient disk member between the hub and rim, a resilient rim and in the place of the ordinary spaces between the spokes to provide comparatively rigid braces.

Referring to the drawings:

Figure 1 is a side elevation of my wheel.

Fig. 2, is a transverse section on the line 2—2 of Fig. 1.

Referring to the drawings, numeral 1 represents a disk-like body composed preferably of flexible and resilient material such as rubber or its equivalent, the same having a central opening 2 and being provided on each side of said opening with hub plates 3 having each an opening 4 corresponding with the central aperture 2, the purpose of the openings being to permit of the introduction of a bushing and axle not shown. The hub-plates 3 are composed of metal and secured to the body 1 by means of bolts 5 which extend through the plates on the opposite sides, and are fastened by nuts 6. The plates 3 as shown, are preferably of a configuration resembling a five-pointed star, having equidistantly spaced radial strengthening fingers or spoke-like members 5.

Equidistantly spaced between the star-like fingers 5 the body 1 is provided with a series of apertures 9 which are largely covered by supporting and coöperating reinforcing plates 10 having arms 11 somewhat similar in shape to the arms of a Maltese cross, the outer ends of each of which arms however, being so rounded that a line joining the arms would form approximately a circle. Extending through each arm is a bolt 12 passing through the body 1 and united to a similar supporting plate on the other side thereof by means of a nut 13. These plates like the ones forming the hub support are of metal though preferably of a somewhat thinner or lighter structure than the hub plates.

The outer peripheral edge of the body 1 is surrounded by a solid tire 14 closely fitted thereon and firmly held in position by metallic tire holding plates 15 of a general triangular shape, bolted to the body 1 by means of bolts 16 passing through the structure and firmly held to like plates 16' on the opposite side.

It will be observed that besides the hub plates 3, bolted on each side of the body, the other plates mentioned when combined with said hub plates fairly well cover the sides of body, to which they are yieldingly but securely attached by means of the bolts. This gives rigidity to the structure as a whole and yet at the same time the flexibility and resiliency in the body absorbs such shocks as may be received by the wheel in transit.

Having thus fully described my invention, what I claim as new and desire to secure by Letters Patent, is:—

1. An automobile cushion wheel comprising a disk of resilient material, an aperture through the center thereof, a hub plate on each side with an aperture, corresponding to the aperture in the disk, other apertures in the disk located equidistantly between the hub plates and the periphery of the disk, coöperating reinforcing plates positioned over said last mentioned apertures and a tread portion fastened to the disk by tire clamping plates.

2. An automobile cushion wheel comprising a disk of resilient material, an aperture through the center thereof, a hub plate on each side with an aperture corresponding to the aperture in the disk and having radial strengthening fingers, other apertures in the disk located equidistantly between the hub plates and the periphery of the disk, coöperating reinforcing plates positioned over said last mentioned apertures and a tread portion fastened to the disk by tire clamping plates.

3. In an automobile cushion wheel comprising a disk of resilient material, an aperture through the center thereof, a hub plate on each side provided with equidistantly spaced fingers and an aperture corresponding to the aperture in the disk, other apertures in the disk located equidistantly between said fingers of the hub plates, coöperating reinforcing plates fastened over said last mentioned apertures and a tread portion fastened to the disk by tire clamping plates.

4. In an automobile cushion wheel comprising a disk of resilient material, an aperture through the center thereof, a hub plate on each side with an aperture corresponding to the aperture in the disk and having radial strengthening fingers, other apertures equidistantly located between the radial strengthening fingers of the hub plates and the periphery of the disk, coöperating reinforcing plates fastened over said last mentioned apertures and a tread portion fastened to the disk by tire clamping members.

5. In an automobile cushion wheel comprising a disk of resilient material, an aperture through the center thereof, a hub plate on each side with an aperture corresponding to the aperture in the disk, other apertures in the disk located equidistantly between the hub plates and the periphery of the disk, coöperating reinforcing plates whose shape is substantially that of a Maltese cross positioned over said last mentioned apertures and a tread fastened to the disk by triangular tire clamping plates.

In testimony whereof, I affix my signature.

MANFRED H. AMBROSE.